United States Patent [19]
Dulong et al.

[11] Patent Number: 5,835,392
[45] Date of Patent: Nov. 10, 1998

[54] METHOD FOR PERFORMING COMPLEX FAST FOURIER TRANSFORMS (FFT'S)

[75] Inventors: Carole Dulong, Saratoga; Larry M. Mennemeier, Boulder Creek, both of Calif.; Eiichi Kowashi, Ryugasaki, Japan; Alexander D. Peleg, Haifa, Israel; Stephen A. Fischer, Rancho Cordova, Calif.

[73] Assignee: Intel Corporation, Santa Clara, Calif.

[21] Appl. No.: 580,467

[22] Filed: Dec. 28, 1995

[51] Int. Cl.$^6$ .............................. G06F 15/00; G06F 7/38
[52] U.S. Cl. .................. 364/726.02; 364/726.07; 364/748.07; 364/748.14; 364/750.5; 395/562
[58] Field of Search ..................... 364/736, 754, 364/750.5, 758, 760, 726.01, 726.02, 726.06, 726.07, 736.04, 736.05, 759, 760.01, 787.01, 748.07, 748.14; 395/650, 675, 750, 800, 375, 400, 562

[56] References Cited

U.S. PATENT DOCUMENTS

| | | | |
|---|---|---|---|
| 3,711,692 | 1/1973 | Batcher | 364/715.09 |
| 3,723,715 | 3/1973 | Chen et al. | 364/786.04 |
| 4,161,784 | 7/1979 | Cushing et al. | 364/748.19 |
| 4,344,151 | 8/1982 | White | 364/754 |
| 4,393,468 | 7/1983 | New | 364/749 |
| 4,418,383 | 11/1983 | Doyle et al. | 395/307 |
| 4,498,177 | 2/1985 | Larson | 371/52 |
| 4,707,800 | 11/1987 | Montrone et al. | 364/788 |
| 4,771,379 | 9/1988 | Ando et al. | 395/800.42 |
| 4,989,168 | 1/1991 | Kuroda et al. | 364/715.09 |
| 5,095,457 | 3/1992 | Jeong | 364/758 |
| 5,111,422 | 5/1992 | Ullrich | 364/750.5 |
| 5,187,679 | 2/1993 | Vassiliadis | 364/786.01 |
| 5,262,976 | 11/1993 | Young et al. | 364/760 |
| 5,327,369 | 7/1994 | Ashkenazi | 364/787.01 |
| 5,367,650 | 11/1994 | Sharangpani et al. | 711/221 |
| 5,442,799 | 8/1995 | Murakami et al. | 395/800 |
| 5,457,805 | 10/1995 | Nakamura | 395/800 |
| 5,500,874 | 3/1996 | Terrell | 375/232 |
| 5,522,051 | 5/1996 | Sharangpani | 395/378 |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp. 1–11.

*MC88110 Programmer's Reference Guide*, Motorola Inc. (1992), pp. 1–4.

*i860™ Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp. 22–32.

*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report (Jan. 1994), pp. 16, 17.

SPARC Technology Business, *UltraSPARC Multimedia Capabilities On–Chip Support for Real–Time Video and Advanced Graphics*, Sun Microsystems (Sep. 1994).

(List continued on next page.)

*Primary Examiner*—Emmanuel L. Moise
*Attorney, Agent, or Firm*—Blakely, Sokoloff, Taylor & Zafman

[57] ABSTRACT

A method in a computer system of performing a butterfly stage of a complex fast fourier transform of two input signals. First, a packed multiply add is performed on a first packed complex value generated from a first input signal and a set of trigonometric values to generate a first product. Then, a second product is generated which comprises the first product with a sign inverted. A packed add of the second product and a second complex value generated from a second input signal is performed to generate a first result, and the first product and the second complex value to generate a second result.

16 Claims, 12 Drawing Sheets

OTHER PUBLICATIONS

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 1994), pp. 12–18.

N. Margulis, *i860 Microprocessor Architecture*, McGraw Hill, Inc. (1990) Ch. 6, 7, 8, 10, 11.

*Pentium Processor User's Manual, vol. 3; Architecture and Programming Manual*, Intel Corporation (1993), Ch. 1, 3, 4, 6, 8, and 18.

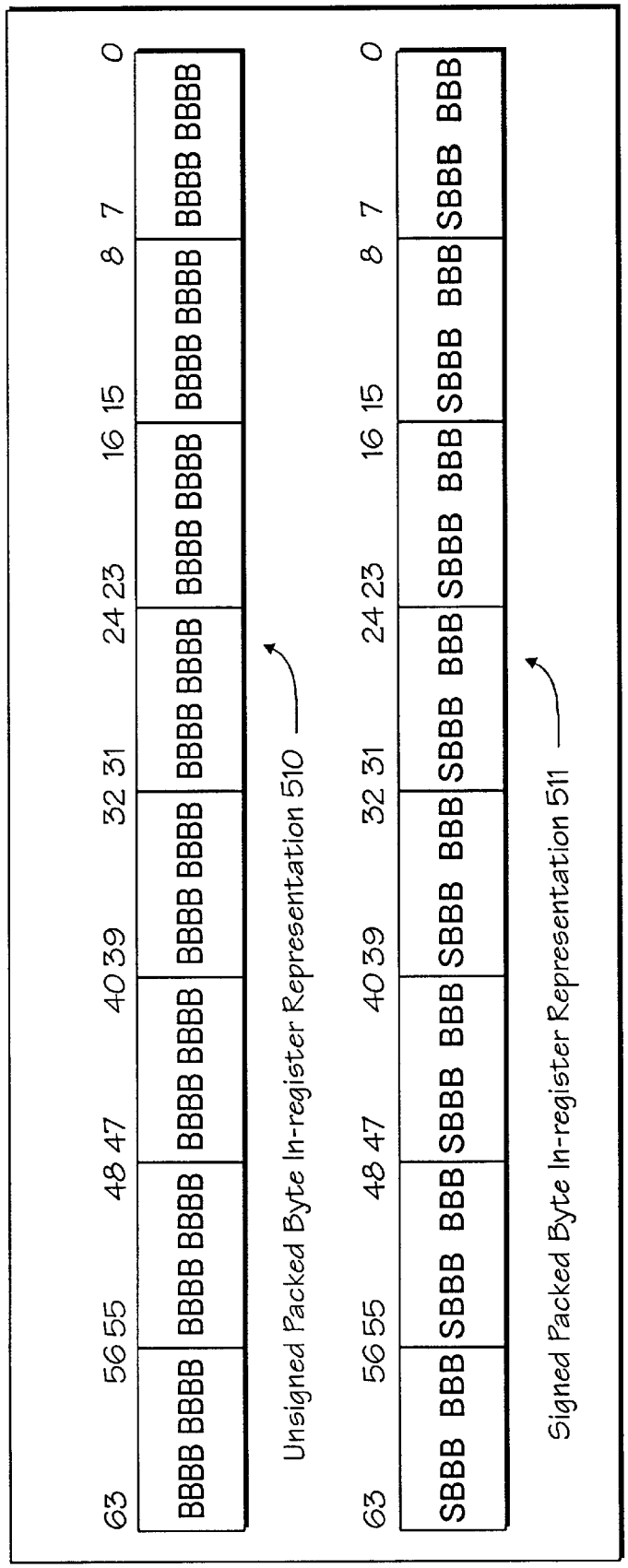

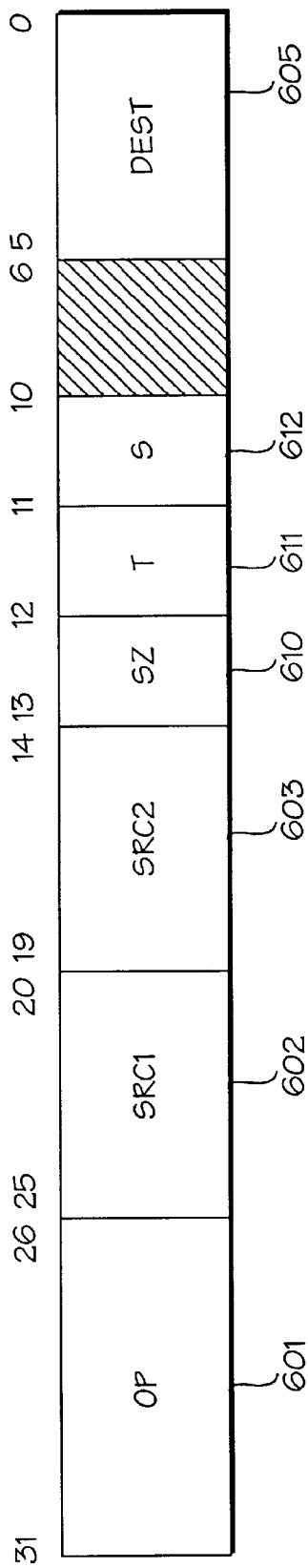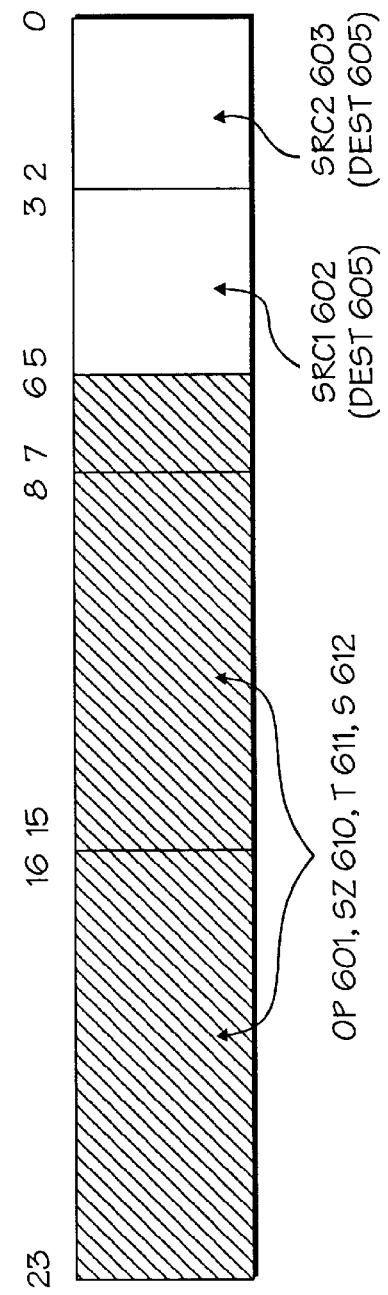

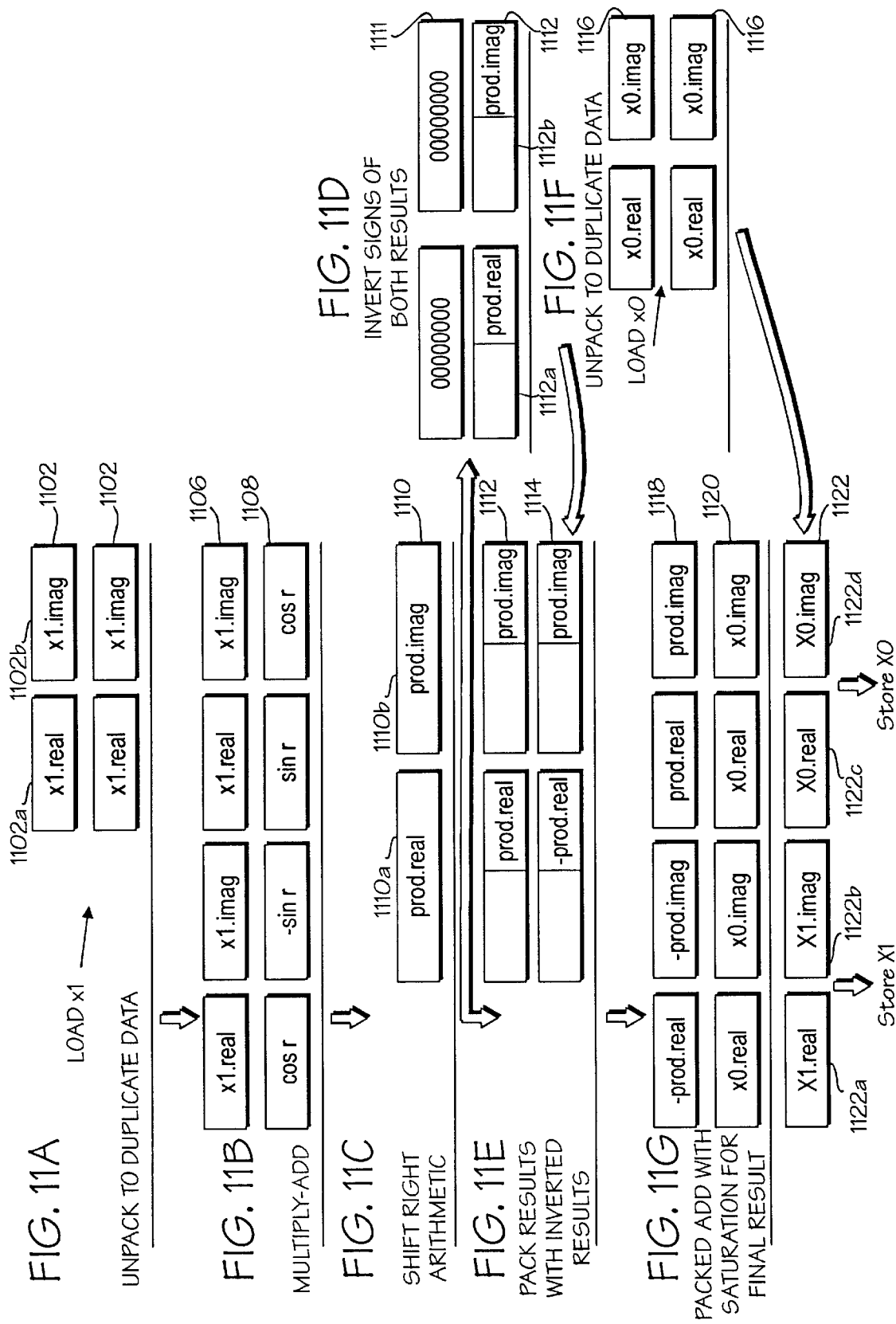

METHOD FOR PERFORMING COMPLEX FAST FOURIER TRANSFORMS (FFT'S)

BACKGROUND

1. Field of the Invention

The invention relates to the field of computer systems. More specifically, the invention relates to the area of systems which execute packed data operations.

2. Background Information

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. However, multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 8 or 16 bits and sound data typically requires 8 or 16 bits. Each of these multimedia applications requires one or more algorithms, each requiring a number of operations. For example, an algorithm may require an add, compare and shift operation.

To improve efficiency of multimedia applications (as well as other applications that have the same characteristics), prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

However, if the loop of operations contains an operation that cannot be performed by the processor on packed data (i.e., the processor lacks the appropriate instruction), the data will have to be unpacked to perform the operation. Therefore, it is desirable to incorporate in a computer system a set of packed data instructions that provide all the required operations for typical multimedia algorithms. However, due to the limited die area on today's general purpose microprocessors, the number of instructions which may be added is limited. Therefore, it is desirable to invent instructions that provide both versatility (i.e. instructions which may be used in a wide variety of multimedia algorithms) and the greatest performance advantage.

One prior art technique for providing operations for use in multimedia algorithms is to couple a separate digital signal processor (DSP) to an existing general purpose processor (e.g., The Intel® 486 manufactured by Intel Corporation of Santa Clara, Calif.). Another prior art solution uses dedicated video and/or audio processors. In either instance, the general purpose processor allocates jobs that can be performed (e.g., video processing) to the DSP or special purpose processor. Many DSP's, however, have lacked packed data format support.

One prior art DSP includes a multiply-accumulate instruction that adds to an accumulator the results of multiplying together two values. (see Kawakami, Yuichi, et al., "A Single-Chip Digital Signal Processor for Voiceband Applications", IEEE International Solid-State Circuits Conference, 1980, pp. 40–41). An example of the multiply-accumulate operation for this DSP is shown below in Table 1, where the instruction is performed on the data values $A_1$ and $B_1$ accessed as Source1 and Source2, respectively.

TABLE 1

| Multiply-Accumulate Source 1, Source 2 | |
|---|---|
| $A_1$ | Source1 |
| $B_1$ | Source2 |
| = | |
| $A_1 B_1$ + Accumulator | Result1 |

One limitation of this prior art instruction is its limited efficiency—i.e., it only operates on 2 values and an accumulator. For example, to multiply and accumulate two sets of 2 values requires the following 2 instructions performed serially: 1) multiply-accumulate the first value from the first set, the first value from the second set, and an accumulator of zero to generate an intermediate accumulator; 2) multiply-accumulate the second value from the first set, the second value from the second set, and the intermediate accumulator to generate the result.

Another prior art DSP includes a multiply-accumulate instruction that operates on two sets of two values and an accumulator. See, Digital Signal Processor with Parallel Multipliers, U.S. Pat. No. 4,771,379, Sep. 13, 1988 to Ando et al. (referred to herein as "Ando et al."). An example of the multiply-accumulate instruction for this DSP is shown below in Table 2, where the instruction is performed on the data values $A_1$, $A_2$, $B_1$ and $B_2$ accessed as Sources 1–4, respectively.

TABLE 2

| Source1 | | Source3 |
|---|---|---|
| $A_1$ | | $A_2$ |
| | Multiply Accumluate | |
| Source2 | | Source 4 |
| $B_1$ | | $B_2$ |
| | = | Result1 |
| $A_1 \cdot B_1 + A_2 \cdot B_2$ + Accumulator | | |

Using this prior art technique, two sets of 2 values stored in four separate source(s) (e.g., RAM or ROM memory locations) are multiplied and then added to an accumulator in one instruction.

One shortcoming of this prior art DSP is that the multiplication and accumulation of two sets of values in this manner using this implementation is difficult to be performed in a processor which is backward compatible with and supports existing instruction sets. Because the performance of these operations requires the access of four source values stored in four source(s) (registers and/or memory locations), an instruction specifying this operation must be capable of specifying four separate source operands. The addition of such an instruction or set of instructions to an existing processor architecture, such as the Intel Architecture processor (IA™, as defined by Intel Corporation of Santa Clara, Calif.; see *Microprocessors,* Intel Data Books volume 1 and volume 2, 1992 and 1993, available from Intel of Santa Clara, Calif.), is difficult because of compatibility concerns with prior versions of the family of processors. It may prevent such a new processor supporting more than two operands from being backward compatible with the existing versions of software capable of being executed on prior versions of these processors.

This multiply-accumulate instruction also has limited versatility because it always adds to the accumulator. As a result, it is difficult to use the instruction for operations other than those that multiply-accumulate. For example, the multiplication of complex numbers is commonly used in multimedia applications. The multiplication of two complex number (e.g., $r_1$ $i_1$ and $r_2$ $i_2$) is performed according to the following equation:

Real Component=$r_1 \cdot r_2 - i_1 \cdot i_2$

Imaginary Component=$r_1 \cdot i_2 + r_2 \cdot i_1$

This prior art DSP cannot perform the function of multiplying together two complex numbers using one multiply-accumulate instruction.

This limitation of a multiply-accumulate instruction can be more clearly seen when the result of such a calculation is needed in a subsequent multiplication operation rather than an accumulation. For example, if the real component were calculated using this prior art DSP, the accumulator would need to be initialized to zero in order to correctly compute the result. Then the accumulator would again need to be initialized to zero in order to calculate the imaginary component. To perform another complex multiplication on the resulting complex number and a third complex number (e.g., r3, i3), the resulting complex number must be rescaled and stored into the acceptable memory format and the accumulator must again be initialized to zero. Then, the complex multiplication can be performed as described above. In each of these operations the ALU, which is devoted to the accumulator, is superfluous hardware and extra instructions are needed to re-initialize this accumulator. These extra instructions for re-initialization would otherwise have been unnecessary.

One application of the prior art multiply and accumulate instruction is the multiplication of two complex numbers. This operation can be performed in a variety of applications, however, it is used for functions such as fourier transforms, especially complex fast fourier transforms. One application of such transforms is a fast algorithm for transforming discrete data from the time domain to the frequency domain. The fast fourier transform (FFT) has a wide variety of applications in signal processing in a computer system, including a V.34 modem data pump, video compression and decompression, or other signal processing applications.

SUMMARY OF THE INVENTION

A method in a computer system of performing a butterfly stage of a complex fast fourier transform of two input signals. First, a packed multiply add is performed on a first packed complex value generated from a first input signal and a set of trigonometric values to generate a first product. Then, a second product is generated which comprises the first product with a sign inverted. A packed add of the second product and a second complex value generated from a second input signal is performed to generate a first result, and the first product and the second complex value to generate a second result.

In implemented embodiments, the method includes a step of packing the first complex value into a single source prior to the step of performing the packed multiply-add, wherein the first complex value comprises a real and an imaginary portion which are packed into the single source. It may also include unpacking the real and imaginary portion from the single source to duplicate the real and imaginary portion in the single source prior to the step of performing the packed multiply-add.

The step of generating the second product may include packing the first product and the first product with the sign inverted into a single source. The method may also include the step of packing the second complex value into a single source, wherein the single source comprises a real and an imaginary portion of the second complex value.

The method may also include the step of unpacking the real and imaginary portion from the single source to duplicate the real and imaginary portion in the single source prior to the step of performing the packed add.

In one implementation, the set of trigonometric values are pre-computed and stored in a table and addressable by an input value (e.g. an index value or "twiddle" factor r). The set of trigonometric values are packed into a single source retrievable from the table. The method may further comprise the step of inputting the input value into the table and retrieving the single source from the table prior to the step of performing the packed multiply add on a first packed complex value and the set of trigonometric values to generate the first product.

In another implementation, the steps may repeat with a third input signal and fourth input signal to generate a third and fourth result, wherein the steps are interleaved and executed in a multi-pipeline superscalar processor.

BRIEF DESCRIPTION OF THE DRAWINGS

The invention is illustrated by way of example, and not limitation, in the figures. Like references indicate similar elements.

FIG. 5a illustrates in-register packed data representations according to one embodiment of the invention.

FIG. 6a illustrates a control signal format for indicating the use of packed data according to one embodiment of the invention.

FIG. 6b illustrates a second control signal format for indicating the use of packed data according to one embodiment of the invention.

FIGS. 9–11g illustrate methods of performing a complex fast fourier transform (FFT) in embodiments of the present invention.

DETAILED DESCRIPTION

Figure 1:
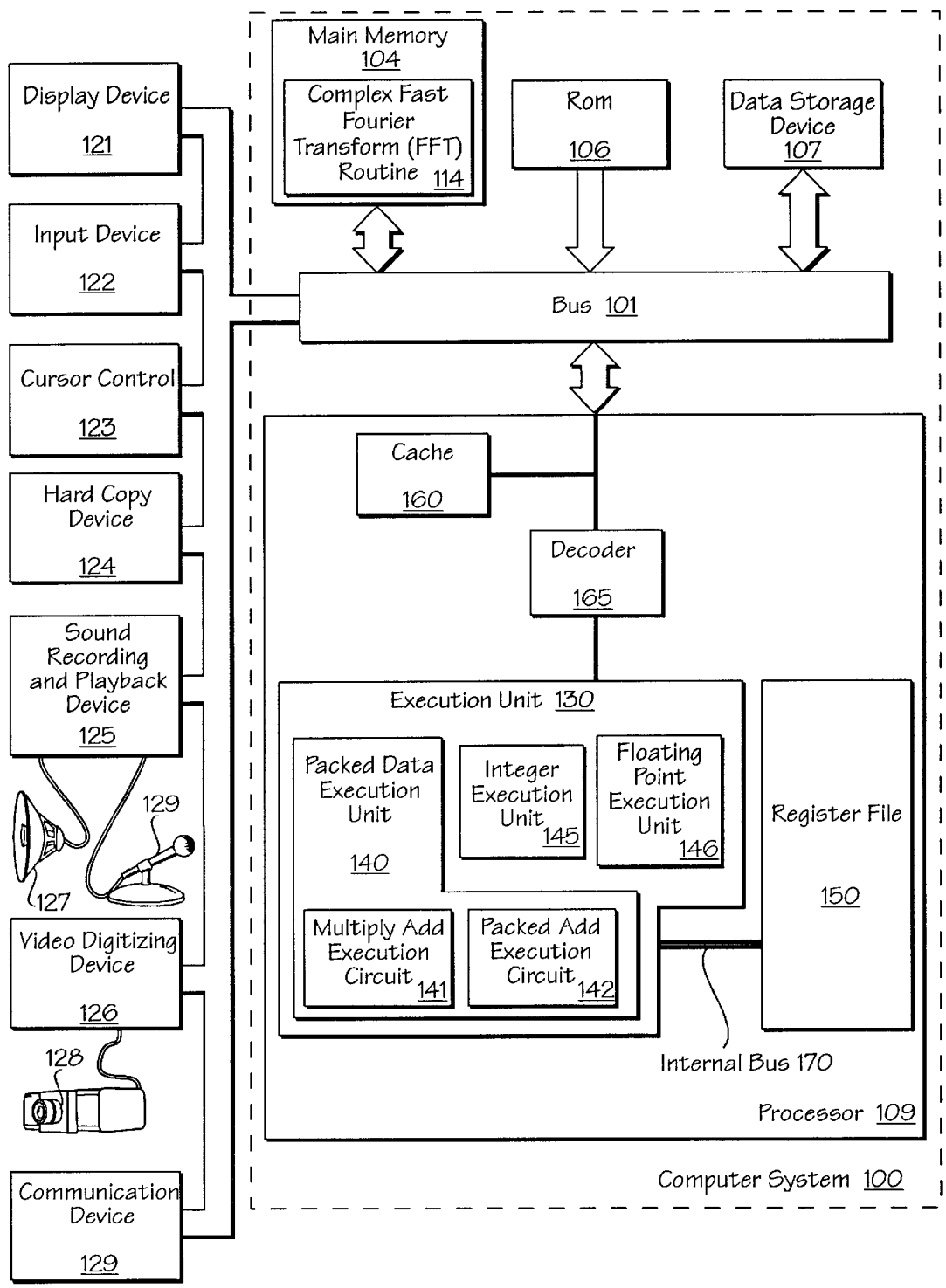
FIG. 1 illustrates an exemplary computer system according to one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

disclosed multiply-add instruction, while Table 3b shows a bit level example of the disclosed multiply-add instruction.

TABLE 3a

| Multiply-Add Source1, Source2 | | | | |
|---|---|---|---|---|
| $A_1$ | $A_2$ | $A_3$ | $A_4$ | Source1 |
| | | | | |
| $B_1$ | $B_2$ | $B_3$ | $B_4$ | Source2 |
| = | | | | |
| $A_1B_1 + A_2B_2$ | | $A_3B_3 + A_4B_4$ | | Result1 |

TABLE 3b

| 11111111 11111111 | 11111111 00000000 | 01110001 11000111 | 01110001 11000111 |
|---|---|---|---|
| 3 | 2 | 1 | 0 |
| Multiply | Multiply | Multiply | Multiply |
| 00000000 00000000 | 00000000 00000001 | 10000000 00000000 | 00000100 00000000 |
| ↓ | ↓ | ↓ | ↓ |
| 32-Bit Intermediate Result 4 | 32-Bit Intermediate Result 3 | 32-Bit Intermediate Result 2 | 32-Bit Intermediate Result 1 |
| Add | | Add | |
| 11111111 11111111 11111111 00000000 | | 11001000 11100011 10011100 00000000 | |
| 1 | | 0 | |

Definitions

To provide a foundation for understanding the description of the embodiments of the invention, the following definitions are provided.

Bit X through Bit Y: defines a subfield of binary number. For example, bit six through bit zero of the byte $001110102$ (shown in base two) represent the subfield $111010_2$. This is also known as a "little endian" convention. The '2' following a binary number indicates base 2. Therefore, $1000_2$ equals $8_{10}$, while $F_{16}$ equals $15_{10}$.

$R_x$: is a register. A register is any device capable of storing and providing data. Further functionality of a register is described below. A register is not necessarily, included on the same die or in the same package as the processor.

SRC1, SRC2, and DEST: identify storage areas (e.g., memory addresses, registers, etc.)

Source1-i and Result1-i: represent data.

Overview

This application describes a method and apparatus for including in a processor instructions for performing multiply-add operations on packed data. In one embodiment, two multiply-add operations are performed using a single multiply-add instruction as shown below in Table 3a and Table 3b. Table 3a shows a simplified representation of the Thus, the described embodiment of the multiple-add instruction multiplies together four corresponding 16-bit data elements of Source1 and Source2 generating two 32-bit intermediate results. These 32-bit intermediate results are summed by pairs producing two 32-bit results that are packed into their respective elements of a packed result. Similar formats are used for source operands and results (powers of 2) with no loss in precision and without the use of an odd size accumulator (e.g., a 24-bit accumulator for 16-bit sources).

As will be further described below, alternative embodiments may vary the number of bits in the data elements, intermediate results, and results. In addition, alternative embodiment may vary the number of data elements used, the number of intermediate results generated, and the number of data elements in the resulting packed data. A multiply-subtract operation may be the same as the multiply-add operation, except the adds are replaced with subtracts. The operation of an example multiply-subtract instruction is shown below in Table 4.

TABLE 4

| Multiply-Subtract Source1, Source2 | | | | |
|---|---|---|---|---|
| $A_1$ | $A_2$ | $A_3$ | $A_4$ | Source1 |
| $B_1$ | $B_2$ | $B_3$ | $B_4$ | Source2 |
| = | | | | |
| $A_1B_1 - A_2B_2$ | | $A_3B_3 - A_4B_4$ | | Result1 |

Of course, alternative embodiments may implement variations of these instructions. For example, alternative embodiments may include an instruction which performs at least one multiply-add operation or at least one multiply-subtract operation. As another example, alternative embodiments may include an instruction which performs at least one multiply-add operation in combination with at least one multiply-subtract operation. As another example, alternative embodiments may include an instruction which perform multiply-add operation(s) and/or multiply-subtract operation(s) in combination with some other operation.

Computer System

FIG. 1 illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. For example, it may be used to store a complex fast fourier transform (FFT) routine 114 which is accessed by processor 109 during system runtime to perform FFT operations on signals, such as those digitized by video digitizing device 126 received from camera 128. It may also be used for processing input audio signals received by microphone 129 into recording device 125, or output signals to speaker 127 via playback device 125. This routine may further be used for processing signals transmitted and/or received by a communication device 129 (e.g., a modem).

Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1 also illustrates that processor 109 includes an execution unit 130, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes packed instructions for performing operations on packed data formats. The packed instruction set includes instructions for supporting multiply-add operations. In addition, the packed instruction set may also include instructions for supporting a pack operation, an unpack operation, a packed add operation, a packed multiply operation, a packed shift operation, a packed compare operation, a population count operation, and a set of packed logical operations (including packed AND, packed ANDNOT, packed OR, and packed XOR) as described in "A Set of Instructions for Operating on Packed Data," filed on Aug. 31, 1995, Ser. No. 08/521,360.

Execution unit 130 is coupled to register file 150 by internal bus 170. Register file 150 represents a storage area on processor 109 for storing information, including data. It is understood that one aspect of the invention is the described instruction set for operating on packed data. According to this aspect of the invention, the storage area used for storing the packed data is not critical. However, one embodiment of the register file 150 is later described with reference to FIG. 2. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

Execution unit 130 includes a plurality of execution units in one embodiment of the present invention. For example, the execution unit 130 may include an integer execution unit 145 for executing integer instructions. In addition, execution unit 130 may include a floating point execution unit 146 for the execution of floating point instruction. Execution unit 130 of processor 109 further includes a packed data execution unit 140 which executes packed data instructions. The packed data execution unit 140 includes a plurality of execution circuits for executing packed data instructions which include, but are not limited to, multiply-add execution circuit 141 and the packed-add execution circuit 142. Other packed data instruction execution units may be present as the implementation requires.

FIG. 1 additionally shows a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone 129 for recording information or a speaker and accompanying amplifier 127 for playing back audio information.

Also, computer system 100 can be a terminal in a computer network (e.g., a LAN). Computer system 100 would then be a computer subsystem of a computer network. System 100 may include a communication device 129 for communicating with other computers, such as a modem or network adapter. Computer system 100 optionally includes video digitizing device 126. Video digitizing device 126 can be used to capture video images provided by a video camera 128 that can be stored or transmitted to other computer systems.

In one embodiment, the processor 109 additionally supports an instruction set which is compatible with the Intel architecture instruction set used by existing processors (e.g., the Pentium® processor) manufactured by Intel Corporation of Santa Clara, Calif. Thus, in one embodiment, processor 109 supports all the operations supported in the Intel Architecture (IA™) processor. As a result, processor 109 can support existing Intel Architecture operations in addition to the operations provided by implementations of the invention. While the invention is described as being incorporated into an Intel Architecture based instruction set, alternative embodiments could incorporate the invention into other instruction sets. For example, the invention could be incorporated into a 64-bit processor using a new instruction set.

Figure 2:
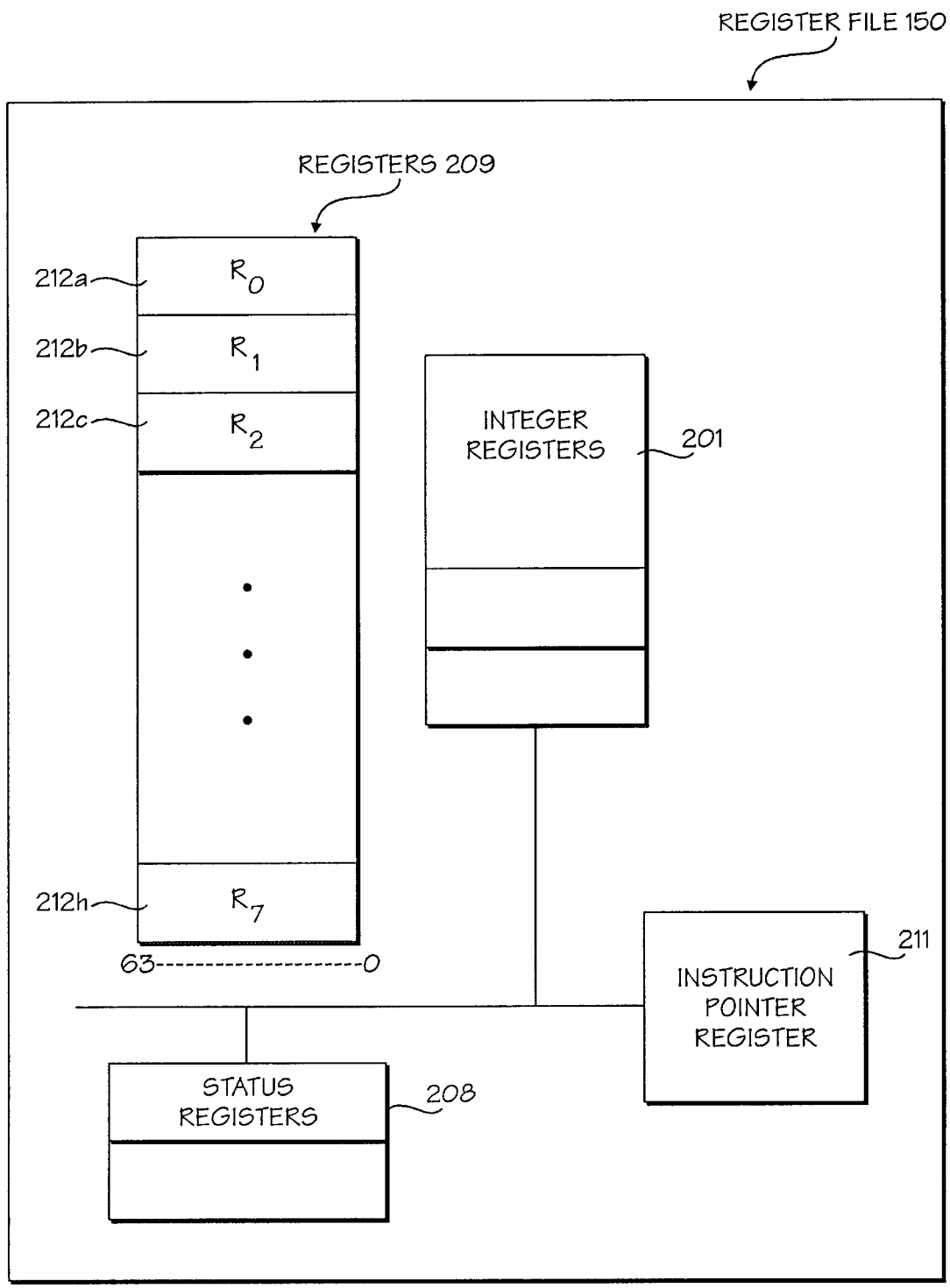
FIG. 2 illustrates a register file of the processor according to one embodiment of the invention.

FIG. 2 illustrates the register file of the processor according to one embodiment of the invention. The register file 150 is used for storing information, including control/status information, integer data, floating point data, and packed data. In the embodiment shown in FIG. 2, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Any additional registers would also be coupled to internal bus 170.

In one embodiment, the registers 209 are used for both packed data and floating point data. In this embodiment, the processor 109, at any given time, must treat the registers 209 as being either stack referenced floating point registers or non-stack referenced packed data registers. A mechanism is included to allow the processor 109 to switch between operating on registers 209 as stack referenced floating point registers and non-stack referenced packed data registers. In another embodiment, the processor 109 may simultaneously operate on registers 209 as non-stack referenced floating point and packed data registers. As another example in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212h, $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209.

Figure 3:
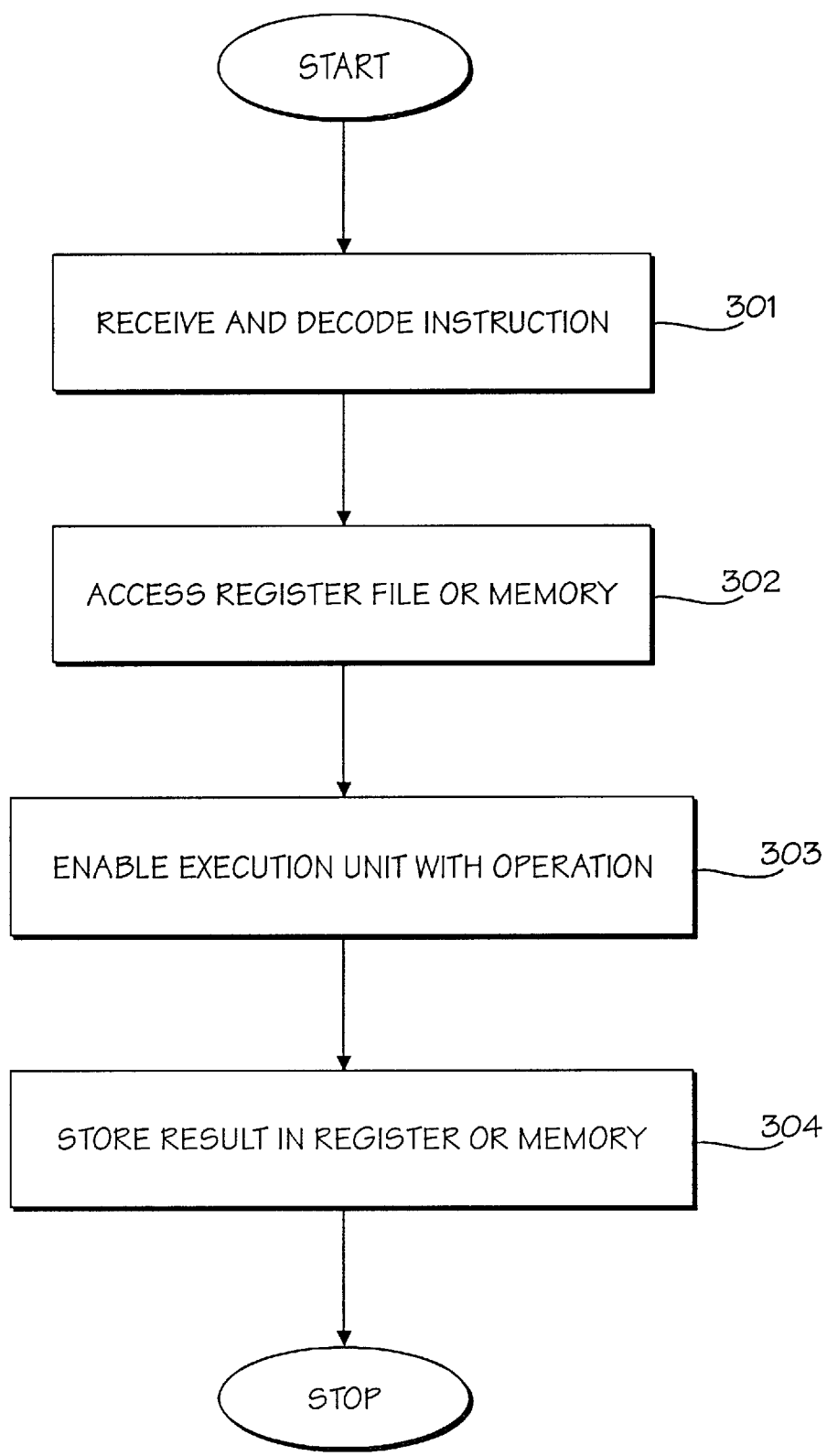
FIG. 3 is a flow diagram illustrating the general steps used by the processor to manipulate data according to one embodiment of the invention.

FIG. 3 is a flow diagram illustrating the general steps are used by the processor to manipulate data according to one embodiment of the invention. That is, FIG. 3 illustrates the steps followed by processor 109 while performing an operation on packed data, performing an operation on unpacked data, or performing some other operation. For example, such operations include a load operation to load a register in register file 150 with data from cache 160, main memory 104, or read only memory (ROM) 106.

At step 301, the decoder 165 receives a control signal from either the cache 160 or bus 101. Decoder 165 decodes the control signal to determine the operations to be performed.

At step 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the invention, any one, or all, of SRC1, SRC2 and DEST, can define a memory location in the addressable memory space of processor 109. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

At step 303, execution unit 130 is enabled to perform the operation on the accessed data. At step 304, the result is stored back into register file 150 according to requirements of the control signal.

Data and Storage Formats

Figure 4:
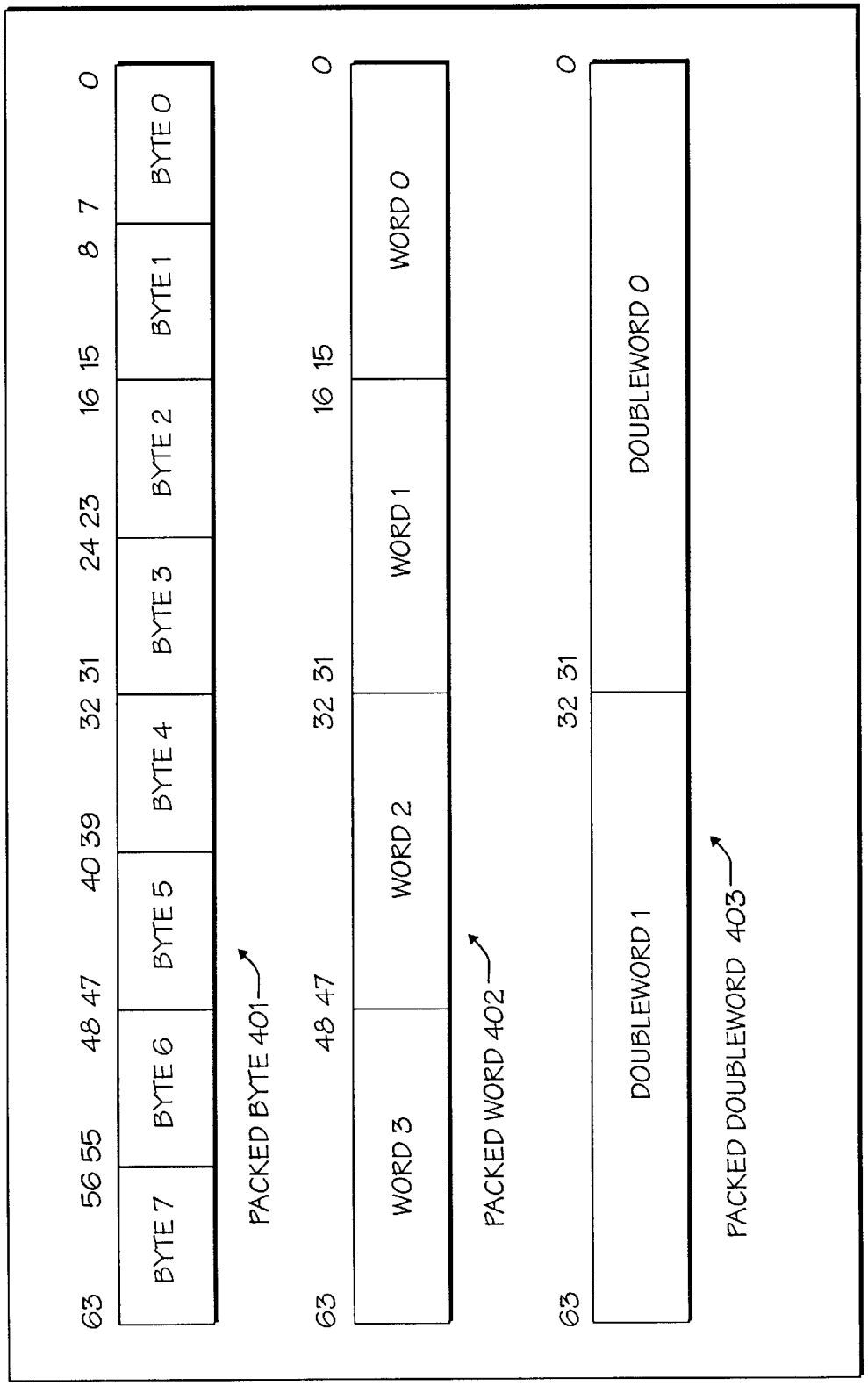
FIG. 4 illustrates packed data-types according to one embodiment of the invention.

FIG. 4 illustrates packed data-types according to one embodiment of the invention. Three packed data formats are illustrated; packed byte 401, packed word 402, and packed doubleword 403. Packed byte, in one embodiment of the invention, is sixty-four bits long containing eight data elements. Each data element is one byte long. A data element is an individual piece of data that is stored in a single register (or memory location) with other data elements of the same length. In one embodiment of the invention, the number of data elements stored in a register is sixty-four bits divided by the length in bits of a data element. Of course, this is extendible to any width which is addressable as a single source operand. The number of data elements capable of being packed is the total source operand size divided by the width of each data element.

In this embodiment, packed word 402 is sixty-four bits long and contains four word 402 data elements. Each word 402 data element contains sixteen bits of information.

Packed doubleword 403 is sixty-four bits long and contains two doubleword 403 data elements. Each doubleword 403 data element contains thirty-two bits of information.

Figure 5B:
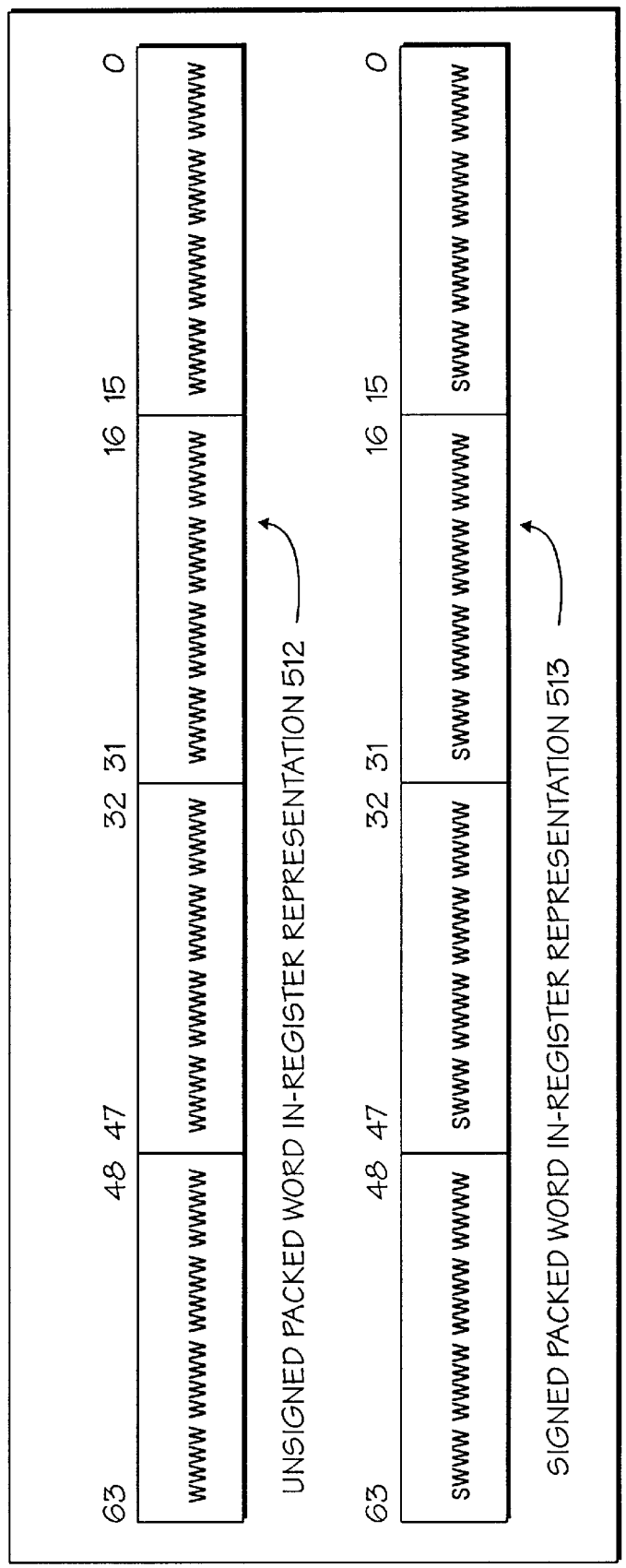
FIG. 5b illustrates in-register packed data representations according to one embodiment of the invention.
Figure 5C:
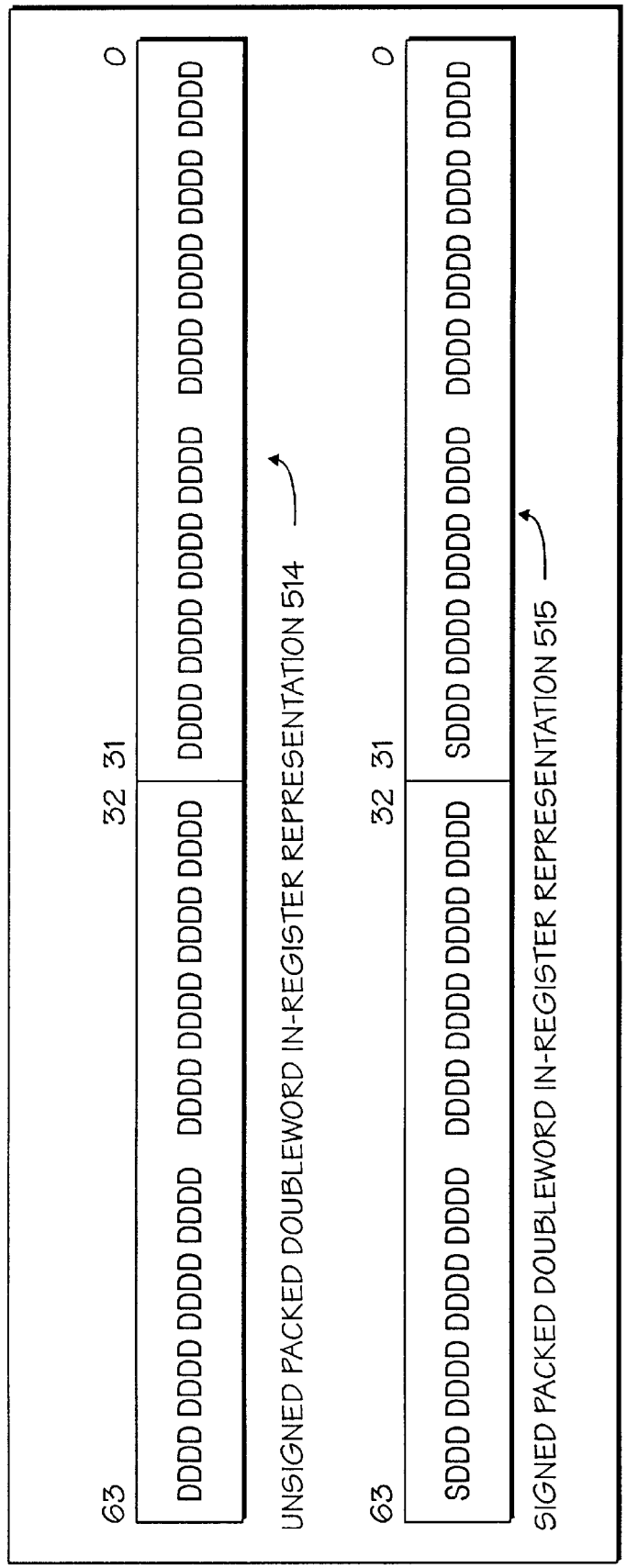
FIG. 5c illustrates in-register packed data representations according to one embodiment of the invention.

FIGS. 5a through 5c illustrate the in-register packed data storage representation according to one embodiment of the invention. Unsigned packed byte in-register representation 510 illustrates the storage of an unsigned packed byte 401 in one of the registers $R_0$ 212a through $R_7$ 212h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte 401. Note that the eighth bit of every byte data element is the sign indicator.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

Control Signal Formats

The following describes one embodiment of the control signal formats used by processor 109 to manipulate packed data. In one embodiment of the invention, control signals are represented as thirty-two bits. Decoder 165 may receive the control signal from bus 101. In another embodiment, decoder 165 can also receive such control signals from cache 160.

FIG. 6a illustrates a control signal format for indicating the use of packed data according to one embodiment of the invention. Operation field OP 601, bit thirty-one through bit twenty-six, provides information about the operation to be performed by processor 109; for example, packed addition, packed subtraction, etc.. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 401. If SZ 610 equals $10_2$, then the packed data is formatted as packed word 402. SZ 610 equaling $00_2$ or $11_2$ is reserved, however, in another embodiment, one of these values could be used to indicate packed doubleword 403.

Control bit T 611, bit eleven, indicates whether the operation is to be carried out with saturate mode. If T 611 equals one, then a saturating operation is performed. If T 611 equals zero, then a non-saturating operation is performed. Saturating operations will be described later.

Control bit S 612, bit ten, indicates the use of a signed operation. If S 612 equals one, then a signed operation is performed. If S 612 equals zero, then an unsigned operation is performed.

FIG. 6b illustrates a second control signal format for indicating the use of packed data according to one embodiment of the invention. This format corresponds with the general integer opcode format described in the "Pentium Processor Family User's Manual," available from Intel Corporation, Literature Sales, P.O. Box 7641, Mt. Prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

Description of Saturate/Unsaturate

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 5.

TABLE 5

| Data Format | Minimum Value | Maximum Value |
| --- | --- | --- |
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{64}-1$ |
| Signed Doubleword | $-2^{63}$ | $2^{63}-1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Multiply-Add Operation(s)

In one embodiment of the invention, the SRC1 register contains packed data (Source1), the SRC2 register contains packed data (Source2), and the DEST register will contain the result (Result) of performing the multiply-add instruction on Source1 and Source2. In the first step of the execution of the multiply-add instruction, Source1 will have each data element independently multiplied by the respective data element of Source2 to generate a set of respective intermediate results. These intermediate results are summed by pairs to generate the Result for the multiply-add instruction. In contrast, these intermediate results are subtracted by pairs to generate the Result for the multiply-subtract instruction.

In one embodiment of the invention, the multiply-add instructions operate on signed packed data and truncate the results to avoid any overflows. In addition, these instructions operate on packed word data and the Result is a packed double word. However, alternative embodiments could support these instructions for other packed data types.

Using the mechanism which will now be described, implemented embodiments of the present invention which implement the multiply-add operation accept as an input a packed word such as 402 shown in FIG. 4 and generate as an output a packed doubleword such as 403 shown in FIG. 4. That is, there are four input source operands, and two output result operands. Because the input and output data are packed, only two sources need to be specified in the invoking instruction. Thus, in contrast to prior art operations which require specification of four input operands and a single output operand (typically, the accumulator as in prior art multiply-accumulate operations), implemented embodiments of the present invention only require the specification of two source operands. This is due to the packing of multiple sources in single operands as shown in the formats of FIG. 4. Note that other packed operands may also be used, according to implementation.

Figure 7:
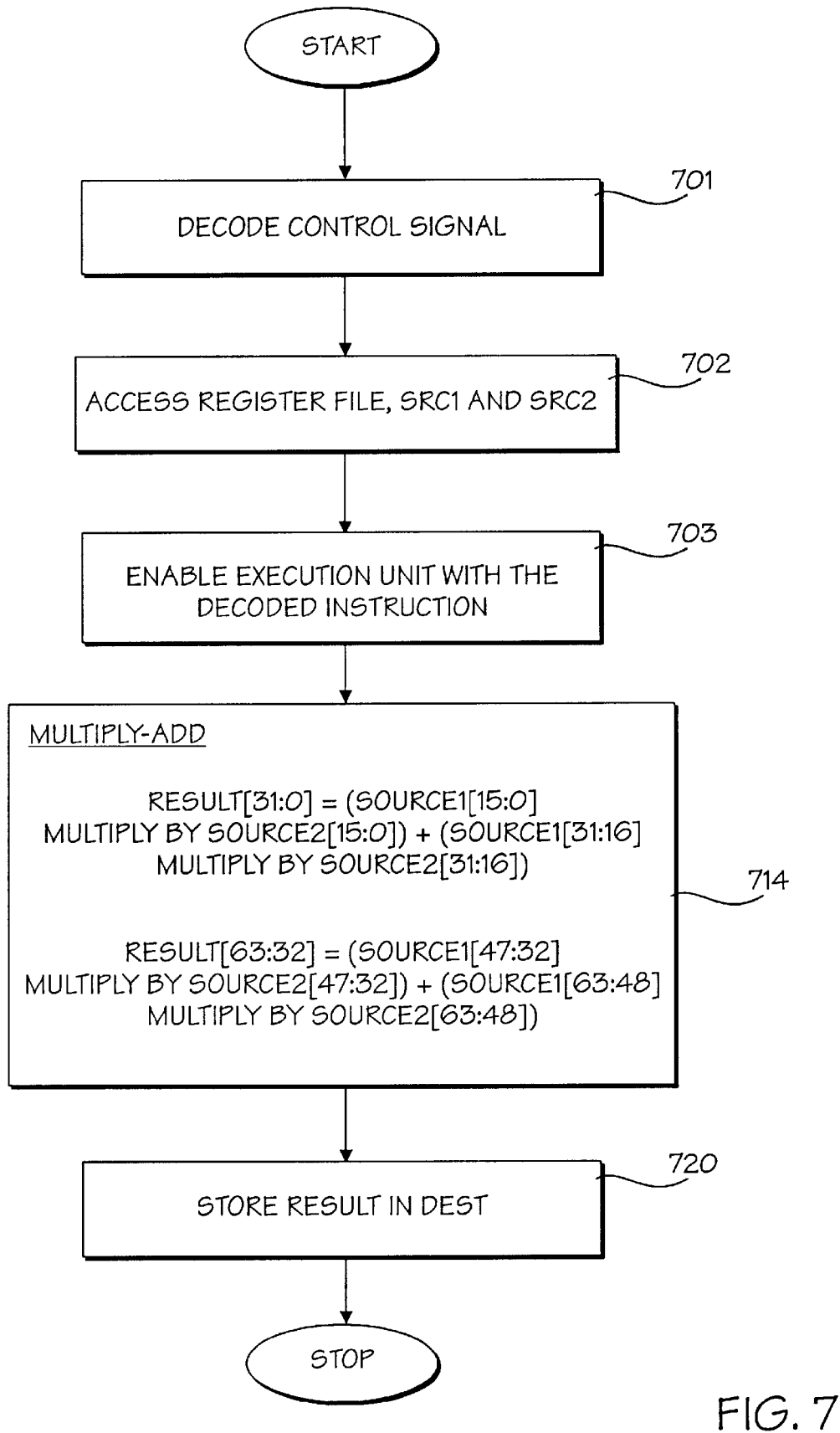
FIG. 7 is a flow diagram illustrating a method for performing multiply-add operations on packed data according to one embodiment of the invention.

FIG. 7 is a flow diagram illustrating a method for performing multiply-add operations on packed data according to one embodiment of the invention.

At step 701, decoder 165 decodes the control signal received by processor 109. Thus, decoder 165 decodes the operation code for a multiply-add instruction At step 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 communicate the packed data to execution unit 130 via internal bus 170.

At step 703, decoder 165 enables execution unit 130 to perform the instruction. If the instruction is a multiply-add instruction, flow passes to step 714.

In step 714, the following is performed. Source1 bits fifteen through zero are multiplied by Source2 bits fifteen through zero generating a first 32-bit intermediate result (intermediate result 1). Source1 bits thirty-one through sixteen are multiplied by Source2 bits thirty-one through sixteen generating a second 32-bit intermediate result (intermediate result 2). Source1 bits forty-seven through thirty-two are multiplied by Source2 bits forty-seven through thirty-two generating a third 32-bit intermediate result (intermediate result 3). Source1 bits sixty-three through forty-eight are multiplied by Source2 bits sixty-three through forty-eight generating a fourth 32-bit intermediate result (intermediate result 4). Intermediate result 1 is added to intermediate result 2 generating Result bits thirty-one through 0, and intermediate result 3 is added to intermediate result 4 generating Result bits sixty-three through thirty-two.

Different embodiments may perform the multiplies and adds serially, in parallel, or in some combination of serial and parallel operations.

At step 720, the Result is stored in the DEST register.

Packed Data Multiply-Add Circuits

In one embodiment, the multiply-add instructions can execute on multiple data elements in the same number of clock cycles as a single multiply on unpacked data. To achieve execution in the same number of clock cycles, parallelism is used. That is, registers are simultaneously instructed to perform the multiply-add operations on the data elements. This is discussed in more detail below.

Figure 8:
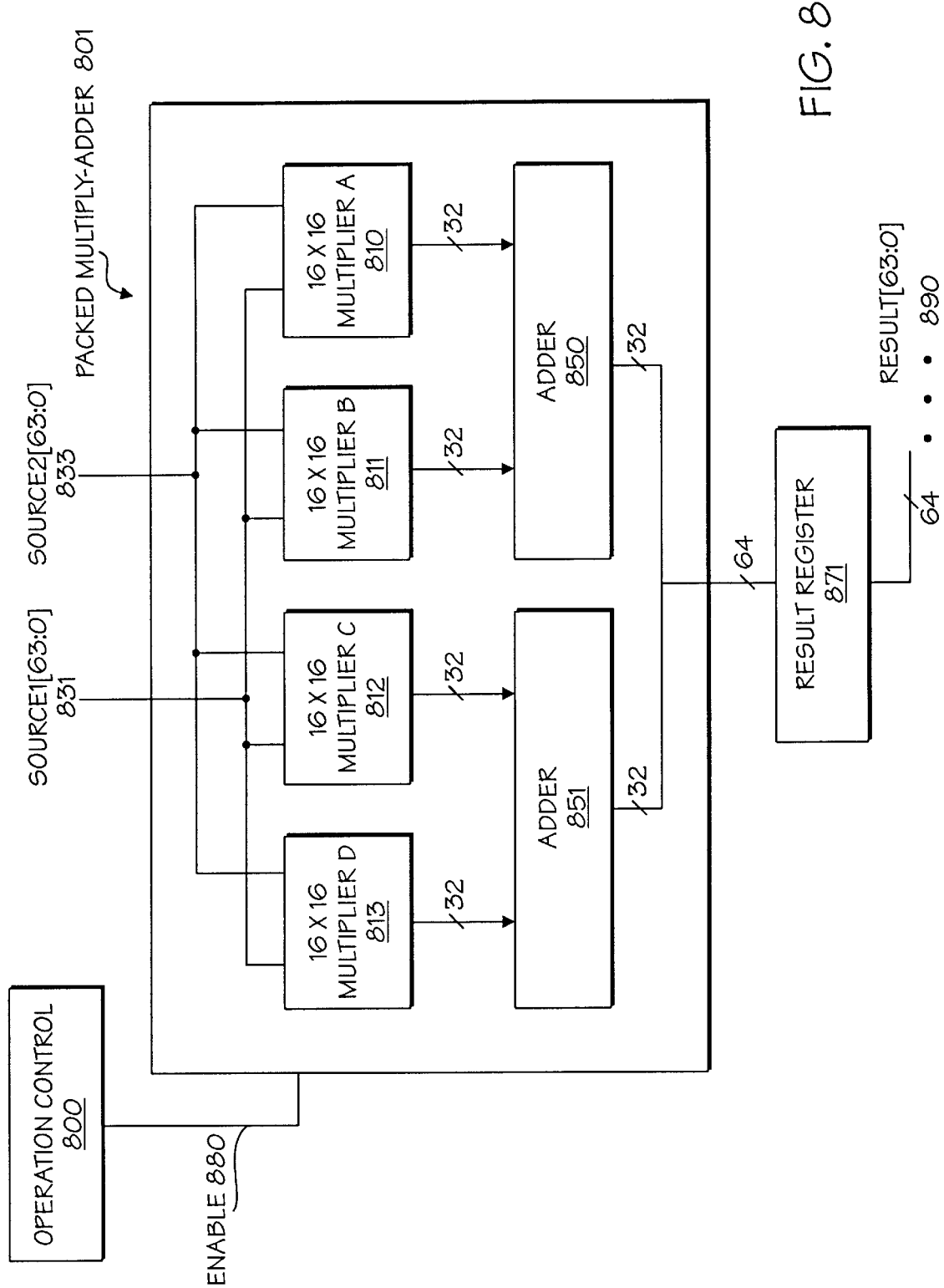
FIG. 8 illustrates a circuit for performing multiply-add operations on packed data according to one embodiment of the invention.

FIG. 8 illustrates a circuit for performing multiply-add operations on packed data according to one embodiment of the invention. Operation control 800 processes the control signal for the multiply-add instructions. Operation control 800 outputs signals on Enable 880 to control Packed multiply-adder.

Packed multiply-adder 801 has the following inputs: Source1[63:0] 831, Source2[63:0] 833, and Enable 880. Packed multiply-adder 801 includes four 16×16 multiplier circuits: 16×16 multiplier A 810, 16×16 multiplier B 811, 16×16 multiplier C 812 and 16×16 multiplier D 813. 16×16 multiplier A 810 has as inputs Source1[15:0] and Source2[15:0]. 16×16 multiplier B 811 has as inputs Source1[31:16] and Source2[31:16]. 16×16 multiplier C 812 has as inputs Source1[47:32] and Source2[47:32]. 16×16 multiplier D 813 has as inputs Source1[63:48] and Source2[63:48]. The 32-bit intermediate results generated by 16×16 multiplier A 810 and 16×16 multiplier B 811 are received by adder 1350, while the 32-bit intermediate results generated by 16×16 multiplier C 812 and 16×16 multiplier D 813 are received by adder 851.

Based on whether the current instruction is a multiply/add instruction, adder 850 and adder 851 add their respective 32-bit inputs. The output of adder 850 (i.e., Result bits 31 through zero of the Result) and the output of adder 851 (i.e., bits 63 through 32 of the Result) are combined into the 64-bit Result and communicated to Result Register 871.

In one embodiment, each of adder 851 and adder 850 are composed of four 8-bit adders with the appropriate propagation delays. However, alternative embodiments could implement adder 851 and adder 850 in any number of ways (e.g., two 32-bit adders).

To perform the equivalent of multiply-add instructions in prior art processors which operate on unpacked data, four separate 16-bit multiply operations and two 32-bit add operations, as well as the necessary load and store operations, would be needed. This wastes data lines and circuitry that are used for the bits that are higher than bit sixteen for Source1 and Source2, and higher than bit thirty two for the Result. As well, the entire 64-bit result generated by the prior art processor may not be of use to the programmer. Therefore, the programmer would have to truncate each result.

Performing the equivalent of this multiply-add instruction using the prior art DSP processor described with reference to Table 1 requires one instruction to zero the accumulator and four multiply-accumulate instructions. Performing the equivalent of this multiply-add instruction using the prior art DSP processor described with reference to Table 2 requires one instruction to zero the accumulator and 2-accumulate instructions.

Advantages of Including the Described Multiply-Add Instruction in the Instruction Set As previously described, the prior art multiply-accumulate instructions always add the results of their multiplications to an accumulator. This accumulator becomes a bottleneck for performing operations other than multiplying and accumulating (e.g., the accumulator must be cleared each time a new set of operations is required which do not require the previous accumulator). This accumulator also becomes a bottleneck if operations, such as rounding, need to be performed before accumulation.

In contrast, the disclosed multiply-add instruction does not carry forward an accumulator. As a result, these instructions are easier to use in a wider variety of algorithms. In addition, software pipelining can be used to achieve comparable throughput. To illustrate the versatility of the multiply-add instruction, several example multimedia algorithms are described below. Some of these multimedia algorithms use additional packed data instructions. The operation of these additional packed data instructions are shown in relation to the described algorithms. For a further description of these packed data instructions, see "A Set of Instructions for Operating on Packed Data", filed on Aug. 31, 1995, Ser. No. 08/521,803, now abandoned. Of course, other packed data instructions could be used. In addition, a number of steps requiring the use of general purpose processor instructions to manage data movement, looping, and conditional branching have been omitted in the following examples.

Complex Fast Fourier Transforms (FFT's)

Figure 9:
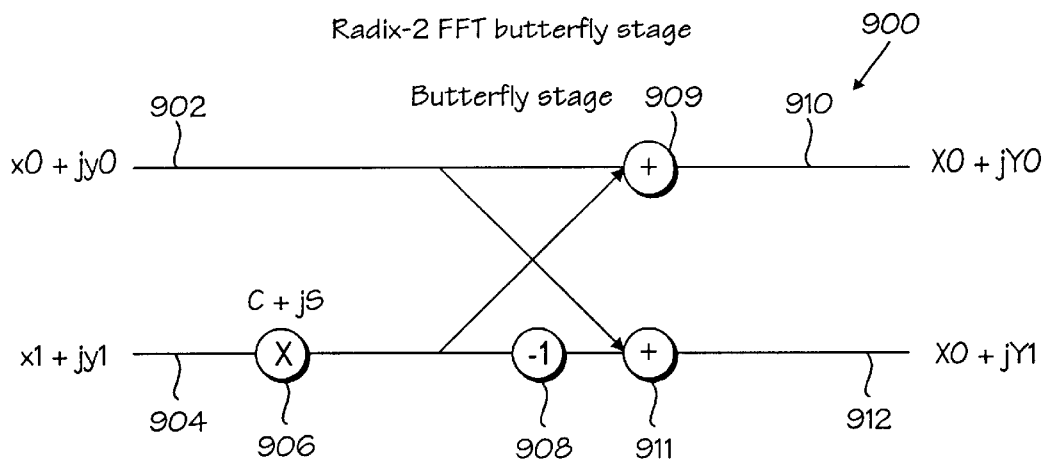

The above-disclosed multiply/add operation and mechanism may be used in a variety of applications, including, but not limited to, the performance of various calculations within signal processing application. One of these includes the complex fast fourier transform (FFT), the computational core of which is referred to as a "butterfly stage" and is shown in FIG. 9. For the purposes of simplicity in discussion, the application of the embodiments of this invention will apply to the optimization of a radix-2 complex butterfly stage.

FIG. 9 shows a complex radix-2 FFT butterfly stage 900. Butterfly stage 900 accepts as inputs digitized signals or other input signal data over signal lines 902 and 904. These correspond with two complex numbers, $x_0$ and $x_1$. Both comprise imaginary components, which are referred to herein as either $x_0.imag$ or $Y_0$, according to the notation. The input signal $x_1$ has its real and imaginary component which are multiplied by a twiddle factor C+jS (COS+jSIN) which is multiplied by the second complex number $x_1$ received over signal lines 904.

The first signal represented by the complex number $x_0$ received over signal line 902 is added by adder 911 to the result of the second complex number received over signal line 904 multiplied by the twiddle factor. This sum is then provided as an output $x_0$ on signal lines 910. In addition, the first complex number $x_0$ is added by adder 911 to the sign-inverted product of the second complex number $x_1$ multiplied by the twiddle factor. This product is then provided on signal lines 912.

In summary, the complex arithmetic of the above butterfly stage is set forth as follows:

$$X0 = x0 + (x1 * \cos r - y1 * \sin r)$$

$$Y0 = y0 + (x1 * \sin r + y1 * \cos r)$$

$$X1 = x0 - (x1 * \cos r - y1 * \sin r)$$

$$Y1 = y0 - (x1 * \sin r + y1 * \cos r)$$

Because the complex multiply product is required for both the upper and lower pairs of equations, only a single complex multiply, a single add, and a single subtract are required to solve all four of these equations.

In implemented embodiments of the present invention, the values returned from the trigonometric functions COS and SIN are pre-computed and stored in a table in a packed format which is the same as the packed format of the input data. The function values can be used for performing complex multiply operations using the packed multiply-add instruction as set forth above. The lookup of the quad-word packed twiddle factor can be simply retrieved by input of the parameter r, a constant for any specific radix-2 FFT butterfly stage. That is, r is used to perform a table lookup wherein the trigonometric values are returned and used during the packed multiply-add operation.

Once the subsequent real and imaginary portions of the product have been calculated from the packed multiply-add operation, a copy is made, is sign-inverted, and a packed-add operation may be applied to the products in order to generate the final results. The flow and method of these operations is discussed and illustrated with reference to FIGS. 10 and 11a–11g.

One method shown in FIGS. 10 and 11a–11g assumes that the input data at each butterfly stage is stored in packed sixteen-bit complex pairs with a fractional decimal format of S1.14. That is, each complex input value such as 1102 shown in FIG. 11a is stored into two sixteen-bit portions 1102a and 1102b for real and imaginary portions of the number, respectively. The first step in the process is to unpack the first source 1102 ($x_1$) in order to make a copy of it in preparation for the packed multiply operation. Thus, the doubleword input data $x_1$ is packed into a quad-word packed source 1106 for the purpose of the complex arithmetic performed in this embodiment, such as the packed multiply-add operation.

Figure 10:
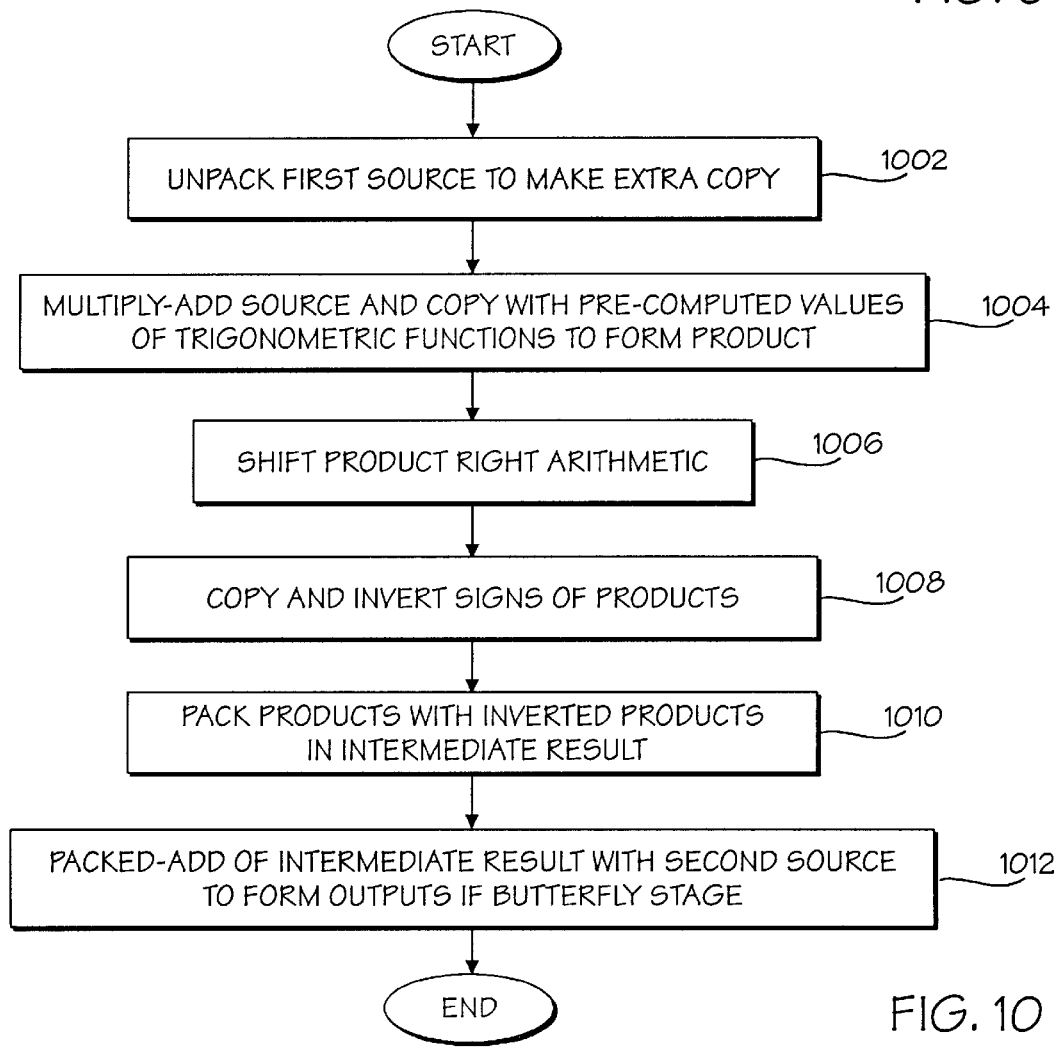

After the first input source $x_1$ is expanded into a packed quad-word format 1106 as shown in FIG. 11b, it is multiply-added with the twiddle factor corresponding to the butterfly stage at step 1004 shown in FIG. 10. The twiddle factor containing the pre-computed trigonometric values which may be stored in a lookup table is also stored in packed quad-word format such as 1108 shown in FIG. 11b.

The result of the multiply-add operation is then placed into a result register or memory location 1110 which contain two doublewords 1110a and 1110b as shown in FIG. 11c, the real and imaginary portions of the product, respectively. Subsequent to the packed multiply-add operation 1004 shown in FIG. 10, the resulting real and imaginary portions of the product 1110a and 1110b are right arithmetically shifted down to the lower word in order to retain the sign and restore the fractional decimal format to S1.14 format. Because a right shift by sixteen is required to move data down by one word and a left shift by two is required to move the decimal point from S3.28 to S1.14 format, the net right shift required is 14. Of course, this is only in implemented embodiments of the present invention, and the numeric format may vary for different applications. The resulting right shifted value of the product are shown in 1112a and 1112b of FIGS. 11d and 11e.

Subsequently thereto, the signs of both of the right shifted products are inverted to form a pair of inverted products 1114. This is performed at step 1008 wherein, in an implementation as shown in FIG. 11d, the right shifted products stored in the two sources 1112a and 1112b are subtracted from zero, such as that stored in an immediate operand 1111. The result is the inverted products 1114 as shown in FIG. 11e in S1.14 format. Subsequently thereto, the inverted products 1114 and the products 1112 are packed at step 1010 in order to form quad-word packed value 1118 shown in FIG. 11g which is used for generation of the final results. In addition, as illustrated in FIG. 11f, the other source $x_0$ may be loaded into a first source register 1116 and unpacked to duplicate the data in a single quad-word packed source 1120 shown in FIG. 11g. 1118 and 1120 are then used for formation of the final result containing the two values $x_1$ and $x_0$ for the final step.

The packed quad-word value 1118 and the packed quad-word value from the unpack operation 1120 are now used for formation of the final results of the butterfly stage. This is performed using a simple packed-add operation with saturation (PADDSw) to produce the final result 1122 of the butterfly stage. A packed-add operation, such as that disclosed in U.S. Pat. No. 5,327,369 of Ashkenazi which is assigned to the assignee of the present invention may be used for this final packed-add operation. Any other packed-add operation may also be used. The results of the packed-add operation is a quad-word 1122 which has packed therein the two results $x_0$ and $x_1$ of the butterfly stage. The high portion of the butterfly stage 1122a and 1122b contain the real and imaginary portions of $x_1$ respectively, and the lower portion 1122c and 1122d of the resulting quad-word contain the real and imaginary portions of $x_0$. The outputs of the butterfly stage can then be stored in any other format, as the implementation requires, unpacked, packed, or to a separate location via any prior art save, data movement, or unpack operations.

In one implementation, the above-described method shown with reference to FIGS. 10 and 11a–11g are performed sequentially in a sequential execution processor. In another implementation, code for two butterfly stages may be interleaved in a superscalar processor having multiple execution pipelines in order to achieve performance increases over prior art sequential execution methods. In this implementation, the execution unit 130 of processor 109 includes a superscalar pipeline execution unit which allows processing of two butterfly stages in parallel. Because data dependencies with respect to each portion of the butterfly stage can be eliminated, the butterfly stage can be performed within this embodiment of the present invention using only eight clock cycles.

In this embodiment of the invention, a superscalar pipelined processor such as that disclosed in U.S. Pat. No. 5,367,650 of Sharangpani, et al. which is assigned to the assignee of the present invention, may be used along with the corresponding modification that packed data instructions as well as integer and floating point instructions may be executed in the separate U and V pipelines. Such a pipeline processor comprising two separate execution pipelines U and V is also disclosed in patent application Ser. No. 08/306,252, filed Sep. 14, 1994, now U.S. Pat. No. 5,522,051 of Sharangpani, which is a continuation of Ser. No. 07/922,021, filed Jul. 29, 1992 now abandoned.

In this embodiment of the present invention, the pipeline for the packed data instruction execution unit is divided into the following pipeline stages: PF or prefetch stage, which prefetches instruction bytes; the F stage, wherein the prefetched instruction bytes are parsed into instructions and up to two instructions are fed to an instruction FIFO per clock; the $D_1$ or first decode stage, which deciphers packed data instructions; the $D_2$ or second decode stage, wherein the packed data register file U pipe Source1 is read; the E stage, which corresponds with the execution or E stage of the integer floating point pipe disclosed in the above two references (this is the stage in which the instruction is committed for execution); the Mex stage, which is the execution clock of the packed data pipe; the $M_2$ stage, wherein packed data operations are written to the register file; the $M_3$ stage, which corresponds to the third stage of the multiplier pipe; and the Wmul stage, which is used to write the multiplier result output.

A code example showing the instructions executed in the U pipe and the V pipe is shown below hereto. The parallel execution of the instruction stream in this embodiment for the code segment is shown in Table 6 below.

TABLE 6

Complex FFT butterfly stage processing example

```
; This code computes a pair of radix-2 butterfly stages for a complex
; FFT using MMx instructions. The code for the two butterfly stages
; are interleaved to facilitate a more efficient instruction pairing
; for the P55C.
;
; radix-2 butterfly algorithm;
;     Xmm0 = xmm0 + xmm1*C - xi1*S
;     Xi0  = xi0  + xmm1*S + xi1*C
;     Xmm1 = xmm0 - xmm1*C + xi1*S
;     Xi1  = xi0  - xmm1*S - xi1*C
;
; where:
;
;    xmm0 + jxi0 ------------------ + ---------> Xmm0 + jXi0
;                                  \     ^
;                                   \   /
;                                    \ /
;                                    /\
;                  C + jS           /  \
;                                  /    v
;    xmm1 + jxi1 ----- X --------- + ---------> Xmm1 + jXi1
;                                -1
;
;
; Input stage data format (32 bit packed):   real(16b)   :   imag(16b)
; Output stage data format (32 bit packed):      "       :       "
; Twiddle factor format (64 bit packed): Cos(16b):-Sin(16b):Sin(16b):Cos(16b)
;
; mm0-mm3     Used for processing butterfly stage 0
; mm4-mm7     Used for processing butterfly stage 1
; eax         Pointer to twiddle factor
; ebx         Pointer to input x0 of butterfly stage 0
; edx         Pointer to input x0 of butterfly stage 1
; ecx         Width of butterfly stage (i.e. offset between x0 and x1)
; edi         Pointer to output X0 of butterfly stage 0
; esi         Pointer to output Y0 of butterfly stage 1

; Code is shown below in 2 columns to illustrate how the code is scheduled
; in the P55C U & V pipes.
;
; U-pipe                         V-pipe
;
MOVD   mm0,[ebx+ecx]                                      ;read x1(0)
MOVD   mm4,[edx+ecx]        PUNPCKLdq mm0,mm0             ;read x1(1)       :copy x1(0) high
PMADDwd       mm0,[eax]     PUNPCKLdq mm4,mm4             ;cmplx mul0       :copy x1(1) high
PMADDwd       mm4,[eax]     PXOR      mm1,mm1             ;cmplx mul1       :clear mm1
MOVD   mm3,[ebx]            PXOR      mm5,mm5             ;read x0(0)       :clear mm5
MOVD   mm7,[edx]            PSRAd     mm0,14              ;read x0(1)       :scale prod0
MOVQ   mm2,mm0              PSRAd     mm4,14              ;copy prod0       :scale prod1
MOVQ   mm6,mm4              PUNPCKLdq mm3,mm3             ;copy prod1       :copy x0(0) high
PSUBd  mm1,mm2              PUNPCKLdq mm7,mm7             ;-prod0           :copy x0(1) high
PSUBd  mm5,mm6              PACKSSdw  mm0,mm1             ;-prod1           :format -prd0:prd0
PADDSw mm0,mm3              PACKSSdw  mm4,mm5             ;prod0+x(0)       ;format -prd1:prd1
MOVD   [edi],mm0            PADDSw    mm4,mm7             ;store X0(0)      ;prod1+x(1)
MOVD   [esi],mm4            PSRLd     mm0,16              ;store X0(1)      :get X1(0)
MOVD   [edi+ecx],mm0        PSRLd     mm4,16              ;store X1(0)      :get X1(1)
MOVD   [esi+ecx],mm4                                      ;store X1(1)
;
; end
```

Note that in this block of assembly code, certain mnemonics refer to those used in the Intel Architecture processor. In addition, the mnemonics preceded by a p (e.g., pmaddwd, paddd, and psrlq) refer to the packed data operations. Operands preceded by the prefix "mm" refer to each of the aliased packed data registers 209 in the register file 150. The remaining mnemonics and references specify registers and instructions in the Intel Architecture processor.

As is illustrated, a total of sixteen clocks is required for performance of the two butterfly stages, netting an overall throughput of each the butterfly stages of about eight clocks per butterfly stage. This excludes any index calculation, loop control overhead, and address resolution which is required prior to commencement of the $D_2$ stage. Thus, using this multiple pipeline embodiment, substantial performance increases may be realized over prior art butterfly stages which use multiply/accumulate operations, especially those which are not performed in superscalar processors. Because of the lack of data dependencies, operations can be performed in pairs and in parallel, resulting in net increases in performance of signal processing using such a processor.

Alternative Embodiments

While the described embodiment uses 16-bit data elements to generate 32-bit data elements, alternative embodiments could use different sized inputs to generate different sized outputs. In addition, while in the described embodiment Source1 and Source2 each contain 4 data elements and the multiply-add instruction performs two multiply-add operations, alternative embodiment could operate on packed data having more or less data elements. For example, one alternative embodiment operates on packed data having 8 data elements using 4 multiply-adds generating a resulting packed data having 4 data elements. While in the described embodiment each multiply-add operation operates on 4 data elements by performing 2 multiplies and 1 addition, alternative embodiments could be implemented to operate on more or less data elements using more or less multiplies and additions. As an example, one alternative embodiment operates on 8 data elements using 4 multiplies (one for each pair of data elements) and 3 additions (2 additions to add the results of the 4 multiplies and 1 addition to add the results of the 2 previous additions).

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. In a computer system, a method of performing a butterfly stage of a complex fast fourier transform of two input signals comprising the steps of:
   a. performing a packed multiply add on a first packed complex value generated from a first input signal and a set of trigonometric values to generate a first product;
   b. generating a second product which comprises said first product with a sign inverted, wherein said step of generating said second product further includes packing said first product and said first product with said sign inverted into a single source; and
   c. performing a packed add of said second product and a second complex value generated from a second input signal to generate a first result, and performing a packed add of said first product and said second complex value to generate a second result.

2. The method of claim 1 further comprising the step of packing said first complex value into a single source prior to said step of performing said packed multiply-add, wherein said first complex value comprises a real and an imaginary portion which are packed into said single source.

3. The method of claim 2 further comprising the step of unpacking said real and imaginary portion from said single source to duplicate said real and imaginary portion in said single source prior to said step of performing said packed multiply-add.

4. The method of claim 1 further comprising the step of packing said second complex value into a single source, wherein said single source comprises a real and an imaginary portion of said second complex value.

5. The method of claim 4 further comprising the step of unpacking said real and imaginary portion from said single source to duplicate said real and imaginary portion in said single source prior to said step of performing said packed add.

6. The method of claim 1 wherein said set of trigonometric values are pre-computed and stored in a table and addressable by an input value, said set of trigonometric values being packed into a single source retrievable from said table and said method of claim 1 further comprises the step of inputting said input value into said table and retrieving said single source from said table prior to said step of performing said packed multiply add on a first packed complex value and said set of trigonometric values to generate said first product.

7. The method of claim 1 further comprising the step of repeating said steps a–c with a third input signal and fourth input signal to generate a third and fourth result, wherein said steps are interleaved and executed in a multi-pipeline superscalar processor.

8. In a computer system, a method of performing a butterfly stage of a complex fast fourier transform of two input signals comprising the steps of:
   a. performing a packed multiply add on a first packed complex value generated from a first input signal and a set of pre-computed trigonometric values to generate a first product;
   b. copying said first product to a second product and inverting a sign of said second product;
   c. packing said first product and said sign inverted second product into a single source; and
   d. performing a packed add of said second product and a second complex value generated from a second input signal to generate a first result, and performing a packed add of said first product and said second complex value to generate a second result.

9. The method of claim 8 further comprising the step of repeating said steps a–c with a third input signal and fourth input signal to generate a third and fourth result, wherein said steps are interleaved and executed in a multi-pipeline superscalar processor.

10. A computer-readable medium having stored thereon a plurality of sequences of instructions, said plurality of sequences of instructions including sequences of instructions which when executed by a processor, cause said processor to perform the steps of:
    a. performing a packed multiply add on a first packed complex value generated from a first input signal and a set of trigonometric values to generate a first product;
    b. generating a second product which comprises said first product with a sign inverted, wherein said step of generating said second product further includes packing said first product and said first product with said sign inverted into a single source; and
    c. performing a packed add of said second product and a second complex value generated from a second input signal to generate a first result, and said first product and said second complex value to generate a second result.

11. The computer-readable medium of claim 10 wherein said plurality of sequences of instructions further includes additional instructions which when executed by said processor, cause said processor to further perform the step of packing said first complex value into a single source prior to said step of performing said packed multiply-add, wherein said first complex value comprises a real and an imaginary portion which are packed into said single source.

12. The computer-readable medium of claim 11 wherein said plurality of sequences of instructions further includes additional instructions which when executed by said processor, cause said processor to further perform the step of unpacking said real and imaginary portion from said single source to duplicate said real and imaginary portion in said single source prior to said step of performing said packed multiply-add.

13. The computer-readable medium of claim 10 wherein said plurality of sequences of instructions further includes additional instructions which when executed by said processor, cause said processor to further perform the step of packing said second complex value into a single source, wherein said single source comprises a real and an imaginary portion of said second complex value.

14. The computer-readable medium of claim 13 wherein said plurality of sequences of instructions further includes additional instructions which when executed by said processor, cause said processor to further perform the step of unpacking said real and imaginary portion from said single source to duplicate said real and imaginary portion in said single source prior to said step of performing said packed add.

15. The computer-readable medium of claim 10 wherein said set of trigonometric values are pre-computed and stored in a table and addressable by an input value, said set of trigonometric values being packed into a single source retrievable from said table and said method of claim 1 further comprises the step of inputting said input value into said table and retrieving said single source from said table prior to said step of performing said packed multiply add on a first packed complex value and said set of trigonometric values to generate said first product.

16. The computer-readable medium of claim 10 wherein said plurality of sequences of instructions further includes additional instructions which when executed by said processor, cause said processor to further perform the step of repeating said steps a–c with a third input signal and fourth input signal to generate a third and fourth result, wherein said steps are interleaved and executed in a multi-pipeline superscalar processor.

* * * * *